Nov. 26, 1968    J. H. LEMELSON    3,412,431
DEPOSITION MOLDING APPARATUS AND METHOD
Filed Feb. 6, 1968    2 Sheets-Sheet 1

Fig. I

INVENTOR.
JEROME H. LEMELSON

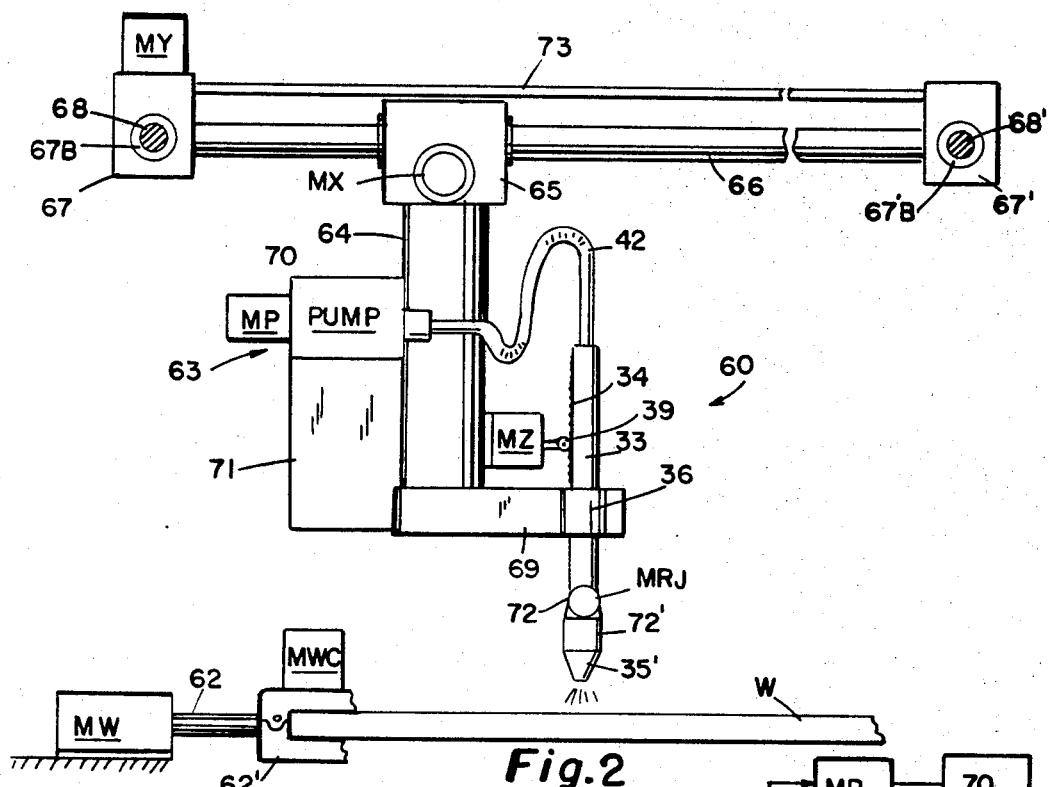
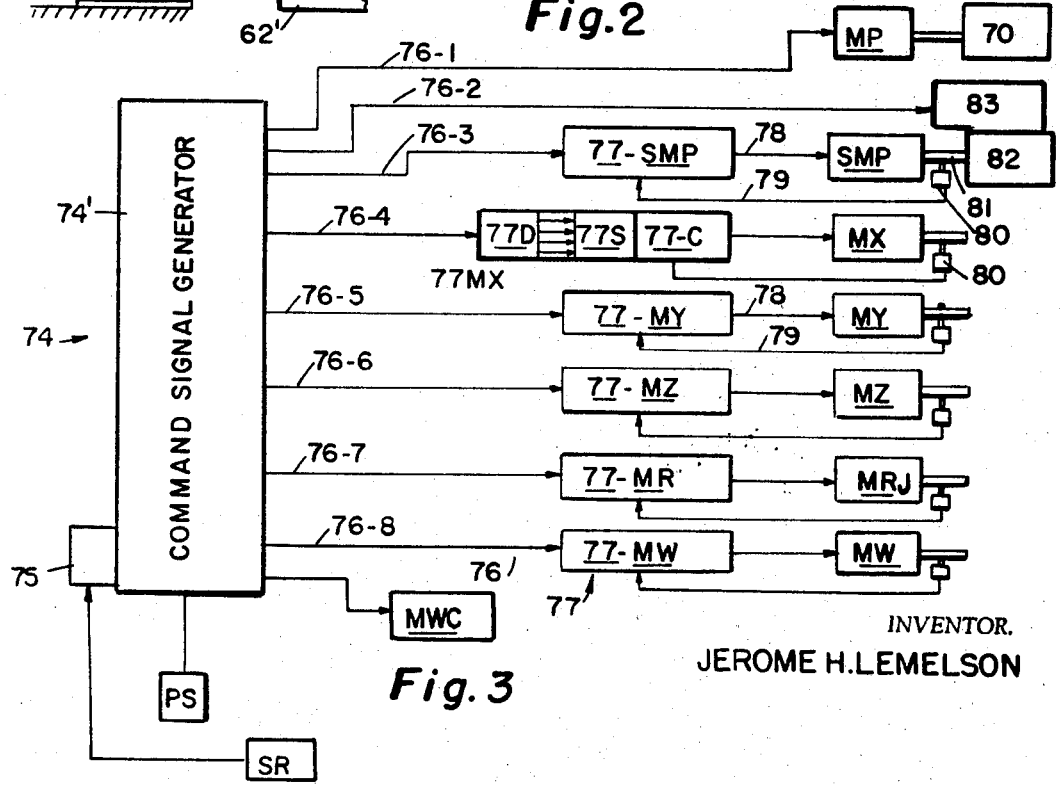
Fig. 2
Fig. 3
INVENTOR.
JEROME H. LEMELSON

United States Patent Office 3,412,431
Patented Nov. 26, 1968

3,412,431
DEPOSITION MOLDING APPARATUS
AND METHOD
Jerome H. Lemelson, 85 Rector St.,
Metuchen, N.J. 08840
Continuation-in-part of applications Ser. No. 734,340,
May 9, 1958, and Ser. No. 439,548, Mar. 15, 1965. This
application Feb. 6, 1968, Ser. No. 703,287
16 Claims. (Cl. 18—26)

ABSTRACT OF THE DISCLOSURE

A molding apparatus and method of molding are provided whereby the flow of molding material into a mold or against the surface of a mold preform is predeterminately controlled together with other molding variables so as to produce a molded article of predetermined shape. Such variables as rate-of-flow of molding material, relative position between a material dispensing means and the molding surface, rate of flow of heat transfer liquid, rotation of mold or preform, and variations in the molding material utilized are predeterminately controlled by means of a computer or cycle controller to predeterminately form or coat articles having predetermined physical characteristics and shape. The computer or controller is of the self-recycling type so that a plurality of articles may be produced which have similar characteristics without the need for manual control or adjustment of the apparatus once the program sequence has been established.

Related applications

This is a continuation-in-part of copending application Ser. No. 439,548 filed Mar. 15, 1965, now Patent No. 3,366,993, for Apparatus and Methods for Molding having as a parent application Ser. No. 734,340 filed May 9, 1958, for Molding Apparatus, now Patent No. 3,171,175, and Ser. No. 552,159 filed May 23, 1966 having parent application 477,467 filed Dec. 24, 1954 and now abandoned.

This invention relates to a program controllable apparatus and method for molding articles of predetermined shape by the controlled deposition and solidification of one or more molding materials in a mold or against a surface of a molding preform such as a male mold member or surface to be coated.

It is known in the art to produce molded articles by depositing a liquid or molten molding material into the mold, allowing a portion of the molding material disposed against the wall of the mold to solidify while the core portion thereof remains liquid and, before permitting the core portion to solidify, pouring out same to form a hollow object. The molding material may also be deposited by spray coating the mold wall. Heretofore, such techniques have been performed without control other than that which is affected by human judgment or mechanical means which is not variably adjustable to effect material deposition and solidification.

It is a primary object of this invention to provide a new and improved molding apparatus and method for molding in which a plurality of molding variables may be predeterminately controlled by an automatic controller such as a computer or variable cycle controller which may be varied in its operation to account for differences in molding materials and article shape requirements.

Another object is to provide an apparatus for molding which may be utilized to mold hollow shapes by means of a plurality of different molding techniques including one or more of the techniques of spray molding, rotational molding, or slush molding.

Another object is to provide a molding apparatus which may employ a plurality of molding techniques one after the other to produce articles of predetermined shape or characteristics.

Another object is to provide a molding apparatus which, by interchanging molds and varying the operation of a program controller, may be utilized to perform different types of molding operations including the production of articles in a mold cavity or against a mold preform.

Another object is to provide a molding apparatus which may also be utilized to automatically perform surface building or layup operations by predeterminately controlling the deposition of material on an article or preform.

With the above and such other objects in view as may hereafter more fully appear, the invention consists of the novel constructions, combinations and arrangements of parts as will be more fully described and illustrated in the accompanying drawing but it is to be understood that changes, variations and modifications may be resorted to which fall within the scope of the invention as claimed.

FIGURE 2 represents an embodiment of the invention used to apply a coating to a base.

FIGURE 3 is a plan layout of the control system for the apparatus of FIGURE 1 or 2.

Figure 1:
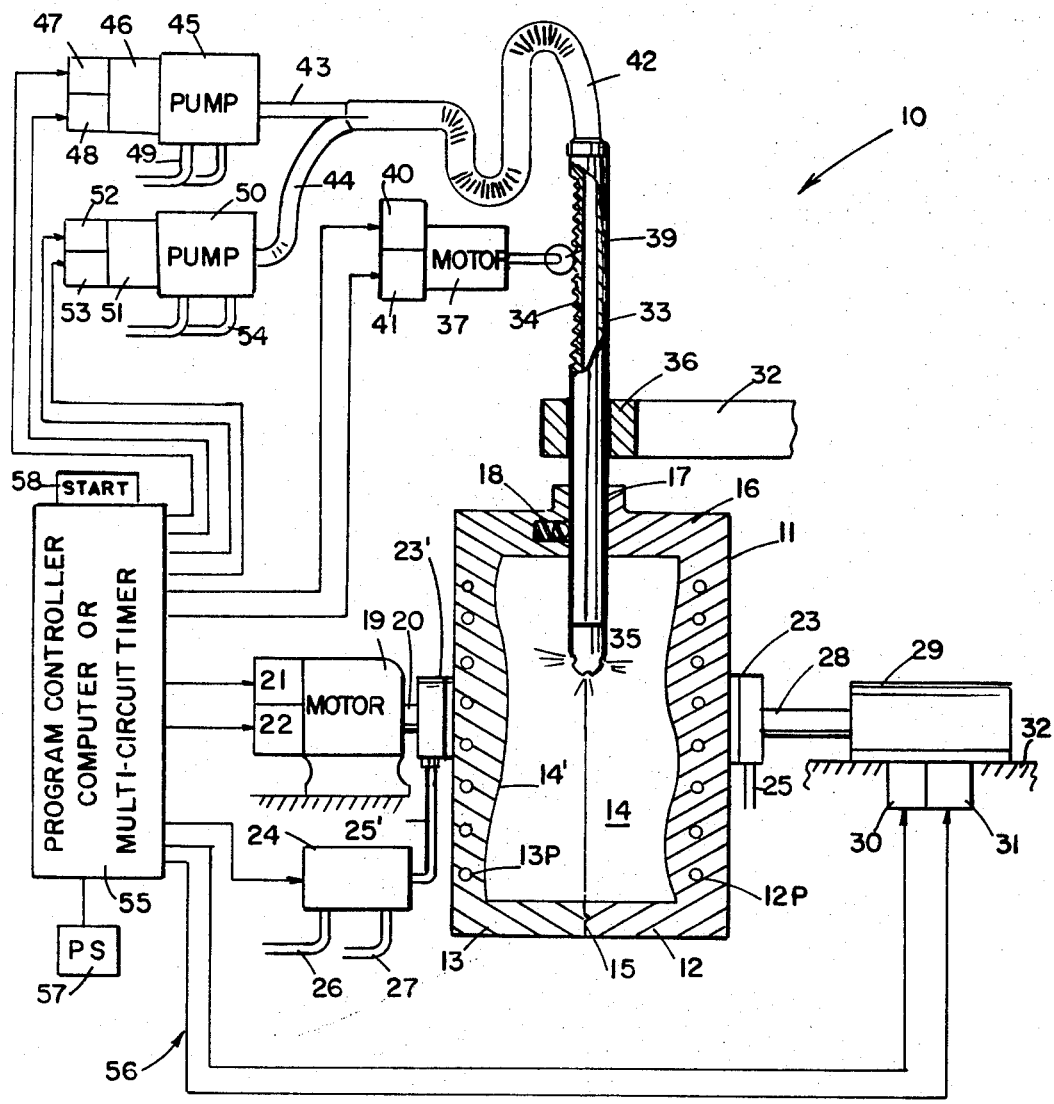
FIGURE 1 represents an embodiment of the invention used to produce molded product.

FIG. 1 of the drawings illustrates schematically aspects of the molding apparatus of the current invention including control means therefore. The apparatus 10 is shown as including a mold 11 made of separable mold parts 12 and 13 defining an internal cavity 14 against the wall 14' of which molding material may be disposed and solidified for forming a hollow molded shape of any suitable configuration. A circumscribing sealing formation or seal 15 is provided between the abutting surfaces of the mold sections 12 and 13 to effect a suitable fluid seal during the molding operation. Mold section 12 is shown supported by a shaft 28 which extends from a lineal actuator 29 such as a pneumatic or hydraulic cylinder which is supported on a base or frame 32 which also supports other components of the apparatus illustrated. Retraction of shaft 28 into actuator 29 results in separation of mold section 12 from section 13 and opening of the mold to permit the molded article to be removed therefrom.

Mold section 13 is supported on a shaft 20 of a rotary electric motor 19 which is also supported by the frame or base 32. The shaft 28 is rotatable freely with respect to its actuator 29 so that the assembled mold 11 may have its two mold sections 12 and 13 rotate together when motor 19 operates so as to distribute molding material throughout the mold 11 in the event that the apparatus is operative to form the molded article at least in part by rotational molding. Notations 12P and 13P refer to passageways through mold sections 12 and 13 through which passageways a heat transfer fluid may be pumped during the molding operation. Rotary fluid couplings 23 and 23' are provided respectively on shafts 20 and 28 and each are connected by respective dual line flexible conduits 25 and 25' to a controlled pump 24 having inlet and outlet lines 26 and 27 from reservoirs or supplies (not shown) of heat transfer fluid. Provided in the upper wall 16 of the mold 11 is a passageway 17 which is normally sealed by means of a ball valve 18, the details of which valve are illustrated and described in application Ser. No. 439,548. Projectable through the opening 17 is an elongated conduit or pipe 33 which, during its downward movement into the mold opens a valve 18 permitting access to the molding cavity 14 as illustrated. The lower end of pipe 33 is adapted by means of threading or other coupling means to receive and retain a nozzle 35 which may be one of a plurality of nozzles which are interchangeable thereon for performing different types of molding operations. Nozzle 35 is shown having three openings therein adapted for spraying one or more materials admitted to the pipe 33 so as to dispose said materials as a coating against the wall 14' of the mold cavity as the pipe and nozzle move up and down in the mold. The pipe 33 is supported in bearing not only by the walls of the opening 17 in the mold but also by a separate lineal bearing member 36 which is supported on the frame or base 32. Formed or assembled with the exterior surface of pipe 33 is a spur-gear 34 extending along a substantial portion of the length thereof such that, when said spur gear is engaged and driven by a pinion gear 39, the nozzle 35 at the end of pipe 33 may be projected a predetermined degree into the mold cavity 14 to perform predetermined molding operations therein. Preferably, nozzle 35 may be driven substantially the complete length of cavity 14 and retracted completely from the mold 11 so that the mold may be rotated or otherwise moved thereafter, depending on the particular mode of operation desired during molding. Pinion gear 39 is operatively connected to a shaft 38 of a controllable servo 37 such as an electric motor having forward and reverse controls 40 and 41. Coupled to the upper end of pipe 33 is a conduit 42 composed of a plurality of flexible tubes 43 and 44 each of which extends from a respective pump 45 and 50 which are operative to feed different molding materials to the pipe 33 and a common or different orifices of the nozzle 45 disposed at the end of 33. Conduit 42 is sufficiently flexible to permit movement of pipe 33 between its extreme positions without restricting flow of molding material.

Pump 45 is operated by a variably controllable servo 46 such as an electric motor having forward and reverse controls 47 and 48 operative to drive pump 45 to inject or remove molding material from the mold. Pump 50 also is operated by a servo 51 having forward and reverse controls 52, 53 for injecting and removing a second molding material. The pump 45 is connected via lines 49 to a reservoir or source (not shown) of suitable molding material while pump 50 is connected through lines 54 to a reservoir or source (not shown) of a second suitable molding material.

The controls for all of the described servos or motors such as mold rotating motor 19, mold opening servo 29, the motor for coolant pump 24, injector drive motor 37 and pump motors 46 and 51 are all operatively connected to the control outputs of a computer or multi-circuit programmable recycle timer 55 through respective output circuits 56 thereof. The program controller 55 may vary from a simple multi-circuit timer employing a constant speed motor driving a shaft with different cams located thereon and operative to open and close switches in sequence for gating electrical energy from a power supply 57 to energize the various motor controls to a more complex and sophisticated automatic controller such as a digital or analog computer which is operative to receive feedback signals from one or more of the described servo motors or the output shafts for positioning and controlling the speed of the various mechanical devices described.

In the embodiment illustrated, motor 19 is provided with forward and reverse controls 21 and 22 each of which is connected to a respective output of the multi-circuit controller 55 so that when one is energized, the motor will drive the mold either in clockwise or counterclockwise direction at constant speed. However, motor 19 may also be of the variable speed type and either or both the controls 21 and 22 may be operative to receive variable signals from the controller 55 in accordance with the manner in which it is programmed to predeterminately vary the speed of movement of mold 11 during a molding cycle. Motor 19 may also be operative by means of suitable mechanical connection to the mold 11 or a support 34 for moving said mold in a direction other than rotary and it is noted that a plurality of motors such as 19 may be utilized to predeterminately rotate the mold about a plurality of axes or otherwise position the mold with respect to the molding material applying device. In other words, by providing suitable means for variably connecting the shaft 20 of motor 19 to a variety of different molds, said molds may be predeterminately rotated, oscillated or otherwise moved during a molding cycle for predeterminately affecting the shape of the article molded. The molding apparatus may thus be utilized to effect the production of a hollow shape in a molding cavity such as 14 or the production of shapes on a male mold preform disposed, in one form, for example, between the ends of shafts 20 and 28 and rotated therebetween while a molding material spraying device such as nozzle 35 is moved with respect to the surface of the preform. In this connection, it is noted that servos 19 and 29 may be mounted on a common base such as 32 which is adjustably pivotable or rotatable with respect to the main frame or base of the molding apparatus so that the rotational axis of shafts 20 and 28 may be varied with respect to the longitudinal axis of pipe 33 and a molding preform disposed between said shafts may rotate about an axis which is substantially parallel to the longitudinal axis of 33.

It is thus seen that the apparatus illustrated in the drawing may be operated in a variety of different manners under the control of the multi-circuit controller 55 to provide a variety of different molded shapes by one or more molding techniques.

A number of modes of operation of the apparatus provided in the drawing are noted as follows:

(1) If the mold 11 is a female mold as illustrated, the pipe 33 may be driven deep into the mold and used to inject a thermoplastic or thermosetting mold material to completely fill the mold. At a predetermined time after the molding material has been injected such that a skin or shell of molding material hardens against the wall 14 of the mold cavity preferably as the result of predetermined control of heat transfer fluid through the mold wall, one of the pumps 45, 50 utilized to inject the molding material is controlled by controller 55 to reverse and to remove that molding material in the core which is still liquid. Accordingly, the end of pipe 33 is positioned by controlled operation of motor 37 to dispose the nozzle 35 a predetermined distance away from the bottom of the mold for removing all of the liquid or molten molding material necessary to completely evacuate the mold of unsolidified molding material at the proper instant in the molding cycle. Thereafter, the pipe 37 is controllably driven upwardly to completely remove the nozzle from the molded article and servo 29 is controlled to open the mold for removal of the article from the mold.

(II) In a second mode of operation, the pipe 33 is predeterminately controlled in its movement back and forth in the mold while one or more molding materials are predeterminately admitted to the nozzle 35 as a constant or variable rate of flow spray against the wall of the mold to spray mold a hollow article by coating and repeated passes of the nozzle to build up said coating to a predetermined thickness which may vary along different portions of the article by predetermined control of the position and/or velocity of the pipe 33 as well as the rate of flow of molding material in accordance with the operation of the controller 55.

(III) The operation described in II above may be utilized for the spray coating or molding of molding material on a male preform disposed as hereinabove described. The computer or cycle controller 55 is programmed to predeterminately control movement of pipe 33, with respect to the male preform or article being coated which may be lineally positioned or rotated as the nozzle is moved back and forth near the surface thereof, flow and/or selection of molding material to the nozzle and the operation of certain other variable means associated with the fabrication procedure.

(IV) Combinations of the described molding procedures may be effected to perform a single molding cycle.

For example, a first portion of an article may be formed by rotational or spray molding in a mold such as 11 by the means described. Thereafter, the pipe 33 may be inserted into the molded article as described and utilized to predeterminately coat the interior of the article just molded. The reverse may also be effected wherein a thin shell is first formed against the wall 14' of the mold cavity 14 by means of the described spray molding technique after which a second molding material may be injected to fill the mold and slush molded inside the first molding material or may be injected to partially fill the mold and rotationally molded therein after the nozzle has been removed from the interior of the article.

In FIG. 2 is shown a modified form of the invention wherein a material dispensing head or spray nozzle 35' is capable of being manipulated about four axes and is predeterminately controlled in its movement with respect to work W together with control of the flow of one or more materials therefrom by an automtic controller such as a digital or analog computer to predeterminately deposit material on the wall of a mold or against one or more preforms. The deposition apparatus 60 includes an overhead supported crane assembly 63 comprising a frame or column support 64 for a reservoir 71 containing one or more materials to be deposited, a pump or pumps 70 for variably feeding said material through a flexible hose 42 to the described flow pipe 33, an arm 69 supporting the slide bearing 36 in which pipe 33 reciprocates up and down, a reversible electric motor MZ having a pinion gear 39 connected to its output shaft for driving column 33 by engaging gear teeth 34 therein and certain other optional equipment such as extra pumps and reservoirs for additional materials to be deposited in a single cycle. The frame 64 is supported from above on a carriage 65 which is drivable back and forth along an overhead trackway 66 by means of a reversible gear-motor MX supported by said carriage. The trackway 66 is supported at its ends by respective carriages 67 and 67' each of which is provided with slide bearings 67B and 67'B or wheels for travel along parallel tracks or rails 68 and 68' which are supported above the floor or work on a frame or columns (not shown). A reversible gear motor MY, like the reversible gear motors MX and MZ, is coupled through suitable gears (not shown) to drive its carriage. Motor MY is shown mounted on carriage 67 and drives same along rail or track 69 by driving a pinion gear engaging a rack (not shown) formed or assembled in a channel along the length of 69. A drive shaft 73 is supported in bearing between carriages 67 and 67' and is driven by motor MY to drive a pinion gear in carriage 6 engaging a rack gear along track 70 to permit the simultaneous driving of the two carriages 67 and 67'.

The spray or flow head 35' is pivotally mounted with respect to tube or pipe 33 by the provision of a pivoted joint 72 connecting the two together and a reversible motor MRJ is secured to tube 33 and operative to rotate the support 72' for head 35' about a horizontal axis. All of described servo motors MX, MY, MZ, MRJ, MP and a means for varying the displacement or output of the pump 70 may be connected to a remotely located computer or master controller through slide wires and/or flexible electrical lines which controller may be provided away from the shown apparatus or may be mounted on one of the components thereof such as the column or frame 64. A further degree of movement for the spray head 35' may be provided by providing a controllable motor driven means for rotating pipe 33 which is controlled by the same means controlling operation of the other servos.

The work W is shown supported below the apparatus 60 held by a support or clamp 62' which is connected to a drive shaft 62 which is driven by a motor MW to rotate or translate the work in one or more directions with respect to the deposition apparatus 60. The motor MW is also controlled by the same master controller or computer employed to control the operation of the motors positioning and operating the spray head 35'. A motor MWC is utilized to open and close the clamp 62' to seize and release work fed thereto and may also be controlled by the single master controller.

FIG. 3 is a schematic diagram of the master controller or computer 74 employed to control movement and operation of the apparatus of FIG. 2. The computer includes a command signal generator 74' which is operative to generate a plurality of digital command control signals or analog signals in sequence which are effective in providing predetermined control of the various described motors for moving the spray head 35' along a predetermined path above or adjacent the surface of the work W while at the same time predeterminately controlling the flow of one or more deposition materials from one or more orifices thereof to build up one or more stratum of deposition material on the work for coating, stratifying or molding said material to shape. While the preform or work W is shown in FIG. 2 as an elongated narrow member or plate, it may of course have any suitable shape and may be moved or retained stationary while the spray head 35' is conveyed in a predetermined path which may be back and forth thereopposite to deposit one or more layers of material thereon for the purposes of coating the substrate per se, changing its shape by adding material thereto which solidifies thereon, reinforcing same or forming a shell-like shape thereon.

The command signal generator 74' may contain a record playback unit such as a multi-channel magnetic tape recorder, punched tape or card reader operative to generate a plurality of command control signals on a plurality of output circuits 76 thereof. Variable motor control for positioning and moving the spray head 35' along a predetermined path with respect to the substrate or work W is effected by simultaneously or sequentially generating variable code or analog signals on output circuits 76–3 to 76–8 which extend to the inputs of comparator devices 77 for the various motors to be controlled. A variable command control signal is generated on output line 76–4 to the input of a comparator-controller 77–MX which controls the operation of the motor MX. The controller 77MX contains a series-to parallel diode converter 77D which converts the series binary digital code generated by the signal generator 74' in reading a recording thereof, to a parallel code which code is transmitted to a relay storage bank 77S containing precision resistors. The relays contained therein are activated by the code signals to form a resistance proportional to the digital information recorded in the command signal generator and such resistance is introduced into a self-balancing bridge circuit forming part of a comparator unit 77C. A feedback signal, generated during the operation of the motor MX being controlled provides an error signal at the output of the comparator 77C which error signal is used to control the operation of the motor until the bridge is balanced or a null condition exists. A succession of digital command signals generated on the line 76–4 may thus be employed to operate the motor MX to cause movement of the crane 64 and the head 35' across the surface of the work, mold or preform W in one direction. Further command control signals generated simultaneously on one or more of the circuits 76–5, 76–6, and 76–7 may be similarly fed to the respective comparator controller units 77–MY, 77MZ and 77MR which respectively control the motors MY, MZ and MR for effecting movement of the spray head 35' in the directions determined by these motors to predetermine the path of movement of said head in space opposite the work. Pump motors MP and 83 connected to deposition material pumps 70 and 82 are operated at constant speed by signals generated on outputs 76–1 and 76–2 of signal generator 74' in the proper sequence. Each of the other comparator controllers defined by notations preceded by the numeral 77 may be constructed similar to the controller unit 77–MX described and may each receive feedback control signals from respective response potentiometers 80 which are coupled to the respective shafts of the motors being controlled and are connected to the controllers 77 by feedback circuits 79. Each comparator unit 77 generates a difference or error signal on its output 78, which signal is the difference between the two input signals to the comparator from signal generators 74' and 80 and is operative to effect predetermined control of the particular motor connected thereto. Closed loop control is thus attained for each motor and by recording all command signals in predetermined positions on a recording member such as a tape, card or cards which are read by unit 74' so that the signals are generated in predetermined timed relationship with respect to each other, the path of movement of head 35' may be predetermined during a deposition or molding cycle.

Control of the rate of flow of deposition material during a cycle of operations on a workpiece or mold is effected in FIG. 3 by signals generated by command signal generator 74' which signals are utilized in such a manner as to permit the flow rate of one or more of the materials being deposited to be perdeterminately changed during a deposition cycle. Certain areas of a workpiece or mold may require, for example, the deposition of greater or lesser amounts of material than other areas and/or changes in the composition of said material. When a signal is generated on the output 76–1 of signal generator 74', it operates pump motor MP driving pump 70 to pump a first deposition material until the line 76–1 is deactivated. A variable displacement pump 82 is also provided in FIG. 3 having an input shaft 81 for varying the displacement of the pump and hence rate of flow of material pumped thereby. The shaft 81 is coupled to the drive shaft of a motor SMP which is controlled to adjust the position of the shaft 81 by signals generated by the signal generator 74' and fed to a comparator controller 77–SMP of the type used to control operation of the other motors as described. A response potentiometer 80 of the type described is coupled to shaft 81 to generate a feed back signal indicative of the rotation of said shaft which signal is bucked against the command signal generated on the input line 76–3 to provide an error signal on the output of controller 77–SMP for controlling the positioning of shaft 81 in accordance with the numerical value of the command control signal. One or more of either or both the described constant or variable output pumps may thus be provided and controlled in their operation to control the flow of one or more deposition materials from respective reservoirs thereof mounted on the crane or provided remote therefrom.

Control of the operation of the work driving motor MW and the motor MWC used to effect holding or seizing and release of the work may also be effected by signals recorded in and reproduced from the signal generator 74' in predetermined timed relationship to the generation of the other described command signals and accordingly, the motor MWC is shown having its control input operatively connected to unit 74' by a circuit 76–9. If the work holding and moving unit is operative to receive work from a feed means such as another conveyor, a scanning relay SR may be utilized to detect the presence of the work thereat and may operate to generate a signal on an input control 75 of the unit 74' to initiate a cycle of operations provided that the previous cycle has ended.

Further details of the command control computer 74 may be found in my copending application Ser. No. 552,-159. Also, details of a multi-channel command controller employing analog signals which are reproduced from recordings thereof for effecting servo motor positioning and speed control, may be found in my copending application Ser. No. 142,405 and may be utilized in effecting motor positioning control of the apparatus of FIG. 2 for conveying the spray head 35' and rate of flow of one or more deposition materials by varying the speed of the pump motors described.

In the circuit diagrams illustrated in FIGS. 1 and 3 it is assumed that the correct power supplies may be provided on the correct sides of all motors and controls, such having been omitted in order to simplify the drawings.

The spraying or deposition means as well as the material deposited thereby as hereinabove described may be subject to a number of design and composition variations. As stated, one or a plurality of different deposition materials may be simultaneously and/or sequentially flowed through a single discharge orifice in the heads 35 and 35' or flowed through separate orifices in a single head or a plurality of nozzles disposed on the same head. Two or more spray or layup materials may be premixed in a single reservoir or after flowing from separate supply sources thereof into a common duct feeding to the head and the mixture or each component thereof may be separately controlled in their timed introduction or rate of flow by computer control means as described. These materials may comprise mixtures or separate flows of such components as (a) thermosetting or thermoplastic resins in solution or in a molten condition, (b) reinforcements and fillers for such resins such as glass or synthetic fibers of plastic or ceramic materials, metal whiskers, etc., glass spheres, etc., (c) metal in powder, atomized or vaporized form, (d) ceramic materials such as ceremets sprayed hot or cold, Portland cement or other mortar, (e) vapors such as metal vapors, plastic polymers or monomers which are polymerized in situ on the mold or substrate on which they are deposited by suitable heating or glow discharge means or chemical spray means also mounted on the spray heads described and program controlled as described in their operation to effect desired predetermined results. The spray head may thus vary from a relatively simple nozzle device operative to spray a fluent material on the mold or substrate to a flame spray gun or an electron gun.

The spray head may also include means for ejecting a gas such as carbon dioxide or other suitable fluid which is operative to rapidly cool and set or chemically react with the liquid or molten material being deposited from the spray head. If the material being deposited is uncured and is heat curable such as an uncured polyester resin, the spray head may contain one or more orifices for ejecting a hot gas such as heated air against the surface containing the just deposited resin to cure or set same in situ on the work. The hot gas may be generated remote from the spray head such as in a reservoir connected thereto, or by suitable electrical heating means or other suitable means disposed in the tube 33 or the spray head itself. An electron gun or laser may also be mounted on the spray head and operated to direct its high energy beam against the material prior to and/or after its deposition on the work for curing or otherwise affecting same. The same heating means may be used to heat the surface of the work prior to depositing material thereon to effect the bonding or welding of said material to the work surface. Means such as an electron gun or laser and/or means for generating and directing a high velocity stream of a gas against the work may be used to erode or otherwise prepare the surface of the work for coating with the deposited material introduced after said preparation. Such latter means may also be mounted on the same or different head used to deposit the coating or molding material.

Surface preparation of the substrate prior to applying any of the described metallic, polymeric or ceramic materials may also be effected by the provision of a fuel burning flame holder or gun at the end of the pipe 33 or on the spray head and controlling operation of same as described to predeterminately heat, erode or melt portions of the substrate during or prior to deposition of material.

Shock waves or explosions generated in the spray head or an auxiliary tube connected thereto by controlled explosion or spark generating means may also be used to prepare the substrate for coating or to effect the coating of material ejected by such waves or explosions against the surface of the work. The said explosions or shock waves may be controlled in their occurrence by command control signals generated as described and used to effect control of the means generating said explosions or waves.

It is noted that variations in the design of the crane 63 provided in FIG. 2 for supporting the spray head 35' may include means for rotating column 64 about a vertical axis on carriage 65 as well as means for otherwise mounting and moving said spray head 35'. For example, spray head 35' may be secured to the upper portion of tube 33 with the lower end thereof closed and may be directed to spray against a vertically disposed surface such as a workpiece or wall panel for painting, coating or building up plastic or cement thereon. Arm 69 may be power rotated on column 64 about a horizontal axis to permit access of the spray head 35' to the top of work structures standing above the floor. The support means for tracks 68 and 68' may include a wheeled vehicle or gantry crane means defining a machine which may be transported to different work sites and disposed over or adjacent to structures, buildings or excavations for performing coating or material layup operations thereon by means of computer control means as described and/or to perform other operations of the types described.

With respect to the delivery of material to be deposited on the workpiece substrate or mold, it is noted that while both a constant flow and variable flow pumps have been provided in FIG. 3, either may be utilized depending on the nature of the deposition requirements, it being noted that the effect of varying the rate of flow of deposition material onto a selected area or areas of the substrate or mold may be attained by varying the rate of movement of the dispensing head across said surface. In other words, since the apparatus provides for program controlled movement of the head across the surface of the work in a manner in which the velocity of the head movement may be varied and controlled, if flow rate is constant, then by reducing the velocity of the head movement across an area being coated a greater amount of material will be deposited thereon than at a faster rate of travel. Accordingly, rate of travel of the dispensing head or flow rate of the material dispensed therefrom may be variably controlled if it is desired to deposit more material on certain areas of the work than others. Where it is desired to vary the composition of a material being deposited or to deposit different materials on the same or different areas of the substrate, two or more variable flow or constant flow pumps such as 45 and 50 or a variable flow and constant flow pump such as 70 and 82 of FIG. 3 may be operatively connected to a single ejection orifice of the dispensing head or to different orifices or nozzles thereof.

The coating material, in addition to being provided in liquid, vapor or gaseous form, may also be provided in particulate or wire form to be blown or flame sprayed against the work. Accordingly, the described pumping means may be replaced or supplemented by suitable particle, wire or filament handling means or a gas pressurized source of material and a solenoid operated valve controlled to open and close by the described master controller or computer.

Further variations in the apparatus described without departing from the nature of the invention are noted with respect to the conveying and dispensing apparatus. The use of a flame spraying means for deposition material has been presented hereinabove and it is noted that such means or an extrusion, spinning or blowing means may be operative to automatically produce at the dispensing head or the means feeding same, a plurality of filaments of ceramic, metal, glass, plastic or combinations of these materials. The filaments so produced may be produced or rendered by cutting in short lengths thereof which may be blown or carried by a fluent material such as a polyester resin or other material against the surface of the work member being coated therewith. The resin may be cured in situ or set by cooling on the surface it is deposited with the freshly formed filaments to form a composite coating or shell thereon as an integral part of the substrate or to be striped thereof as a shell-like manufactured article. The filaments may also be continuously fed to the work as the work rotates to form a filament wound structure thereon as the dispensing head is predeterminately controlled in its movement across the work. The heat generated in the formation of the filaments may be directed against the surface of the work or formation provided thereof to help cure the resin deposited with the filaments. Metal whisker elements of short or long length may also be continuously fed from a supply thereof or means for continuously forming same at the deposition head or the supply reservoir and fed together with plastic, ceramic or metal spray against the surface of the substrate and subsequent similar material deposited thereon.

Variations in the design of the crane apparatus 63 may also include crane trackway mounted on a wheeled vehicle or portable base movable to different work sites.

I claim:

1. Apparatus for variably depositing material against the surface of a substrate to mold or form said material as a coating or shell thereon comprising in combination:

(a) a material dispensing head operative to form a stream of material and predeterminately direct same therefrom, (b) a support for said dispensing head, (c) means for prepositioning said support and a work member adapted to receive and shape material flowed from said head whereby said material may be deposited onto a selected portion of the surface of said member, (d) means for guiding said support in movement in a plurality of directions to predetermine the path of movement of said head across the surface of said member, (e) servo means for power driving said support on said guiding means, (f) first control means for varying the operation of said servo means, (g) supply means for fluent material operatively connected to said dispensing head, (h) servo operated means for causing flow of fluent material from said supply means to said dispensing head, (i) second control means for controlling the operation of said fluent material flow inducing servo operated means, and (j) master control means operatively connected to said first and said second control means to control the operation of said apparatus in a cycle which includes predeterminately varying the location of said dispensing head with respect to said substrate and simultaneously controlling the flow of said material from said dispensing head to predeterminately deposit material onto a selected area of said substrate.

2. Apparatus in accordance wtih claim 1 including power operated means for moving said work member containing said substrate in a predetermined path, said power operated moving means being operatively connected to said master control means to control the movement of said member as part of said operational cycle.

3. Apparatus in accordance with claim 2 including power operated means for securing said work member to said moving means therefor, control means for said securing means being operatively connected to said master control means to control the securing and release of said member from said power operated moving means.

4. Apparatus in accordance with claim 1, said servo means being reversible in operation, said first control means for varying operation of said servo means being operative to cause it to reverse the direction of travel of said head across said work member, and means for relatively moving said dispensing head and said work member in a direction other than that defined by said forward and reverse travel of said head controlled by said first control means whereby the dispensing head may dispose material against different areas of the work member as it travels back and forth across said work member a plurality of times.

5. Apparatus in accordance with claim 1 including means for guiding said support for said material dispensing head in a plurality of different directions and a respective servo means for power driving said head in each of said directions, control means for each of said servo means and each being operatively connected to said master control means for predetermining the path of movement of said head across the surface of said work member.

6. Apparatus in accordance with claim 1 whereby said second control means is operative to start flow of said fluent material when said dispensing head is at a first predetermined position with respect to said work member and to terminate flow of said fluent material when said dispensing head is at a second predetermined position with respect to said work member.

7. Apparatus in accordance with claim 1 whereby said second control means is operative to vary the flow of said fluent material during a deposition cycle and said master control means is operative to cause said control means to effect predetermined variations in the amount of material deposited on said work member so as to deposit different selected amounts of material on different areas thereof.

8. Apparatus in accordance with claim 1 whereby said second control means is operative to vary the composition of material flowed from said head against said work member and is predeterminately controlled by said master control means to predetermine the composition of matter formed by deposition on said work member.

9. Apparatus in accordance with claim 1, said supply means being operative for flowing a plurality of fluent materials to said dispensing head, and respective servo operated means for causing flow of each of said materials and for terminating said flow to said fluid dispensing head.

10. Apparatus in accordance with claim 9 including control means for each of said servo means connected to said master control means, said master control means being operative to control the flow of said plurality of materials whereby different materials may be deposited on different areas of said work member.

11. Apparatus in accordance with claim 5, said master control means including a multi-channel record playback means and record means therefor for generating different command signals on different outputs thereof as reproduced from said record means, means for generating feedback signals each indicative of the operation of a respective of said servo means, comparator means associated with each of said servo means which drives said support for said dispensing head, said comparator means adapted to receive said command and feedback signals and operative to generate respective difference signals, and means for using said difference signals for predeterminately controlling the operation of said servo means to predeterminately controlling the operation of said servo means to predeterminately drive and determine the path of movement of said dispensing head across the surface of said work member.

12. Apparatus in accordance with claim 11 including means for varying the operation of said servo means for causing flow of fluent material from said supply means, said servo varying means being operatively connected to said master control means, said master control means being operative to predeterminately vary the flow of fluent material from said dispensing head during the movement of said head across the surface of said work member.

13. Apparatus in accordance with claim 1, said means for guiding said support for said dispensing head including a crane having a plurality of tracks and a plurality of carriages movable along respective of said tracks and connected together for moving said support in different directions and respective servo means for operating said carriages simultaneously to convey said dispensing head along a path other than defined by one of said tracks.

14. Apparatus in accordance with claim 1 including filamentary material dispensing means supported by said dispensing head and operative to dispense filamentary material against said work member simultaneously with the dispensing of said fluent material.

15. Apparatus in accordance with claim 14 including means for continuously forming filamentary material and feeding said filamentary material to the stream of fluent material flowing from said dispensing head to said work member.

16. Apparatus in accordance with claim 1 wherein said work member comprises a mold having a cavity with a surface adapted to receive material dispensed from said head, means for prepositioning said mold and said support for said dispensing head, and means for retaining said mold stationary while said head support is driven in a predetermined path with respect to said mold to predeterminately deposit material against the surface of said cavity.

References Cited

UNITED STATES PATENTS

| | | | |
|---|---|---|---|
| 2,994,919 | 8/1961 | Schafer et al. | 18—26 |
| 3,173,175 | 3/1965 | Lemelson | 18—26 |
| 3,315,314 | 4/1967 | Barnett et al. | 18—26 |
| 3,350,745 | 11/1967 | Shott et al. | 18—26 |
| 3,366,993 | 2/1968 | Lemelson | 18—26 |

WILLIAM J. STEPHENSON, *Primary Examiner.*